C. E. STEERE.
BLANCHING MACHINE.
APPLICATION FILED AUG. 9, 1915.

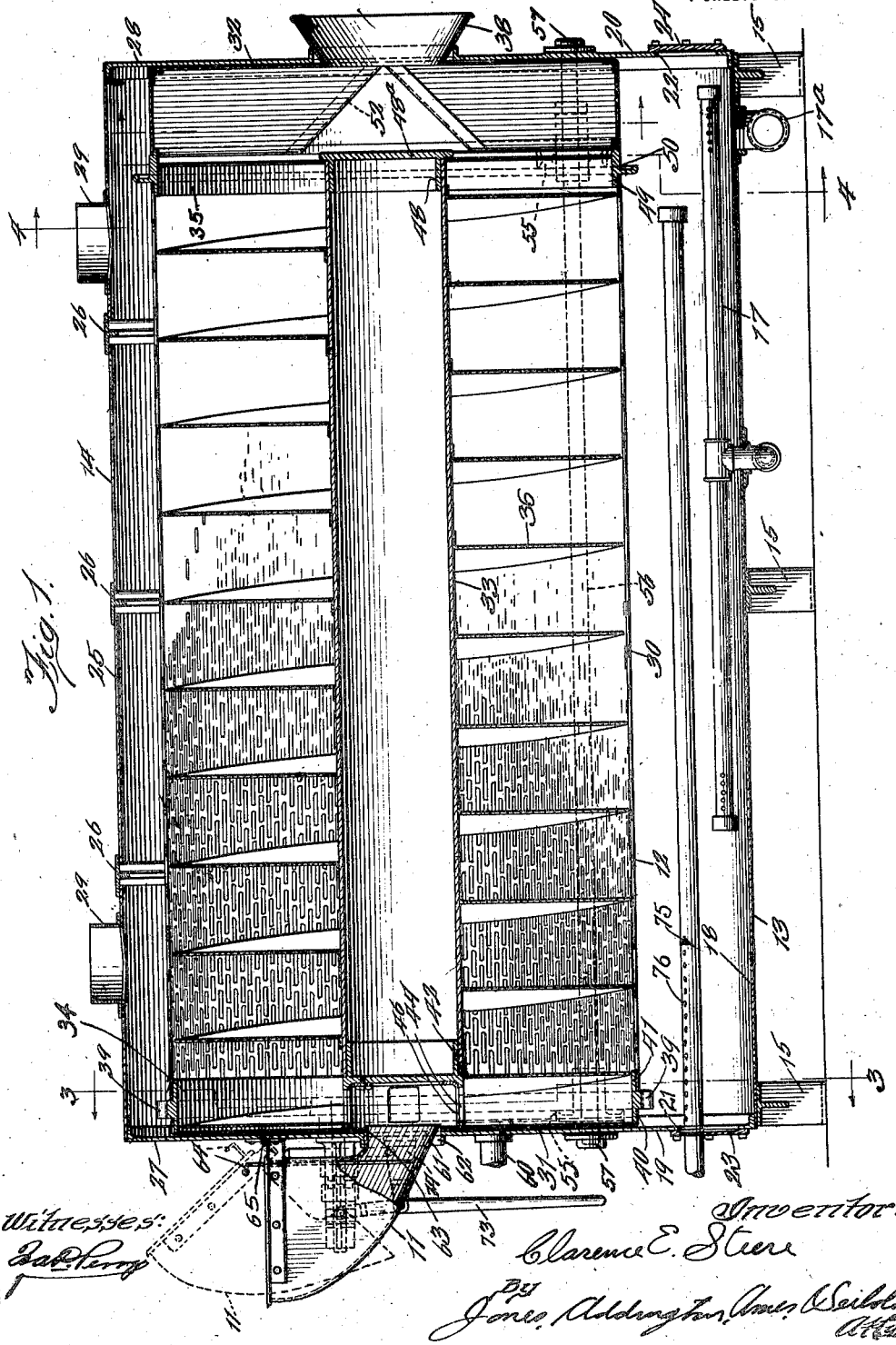

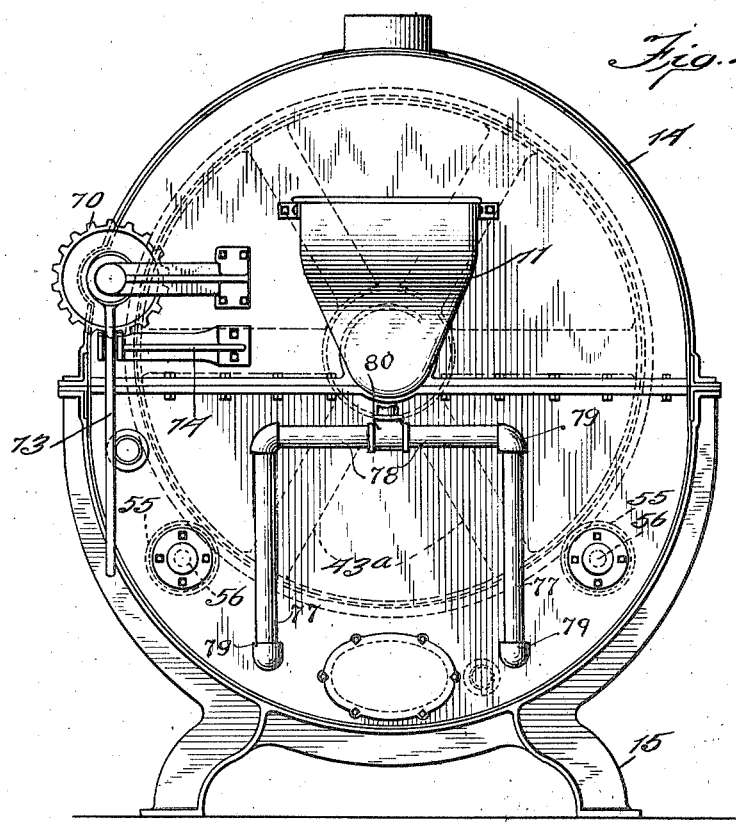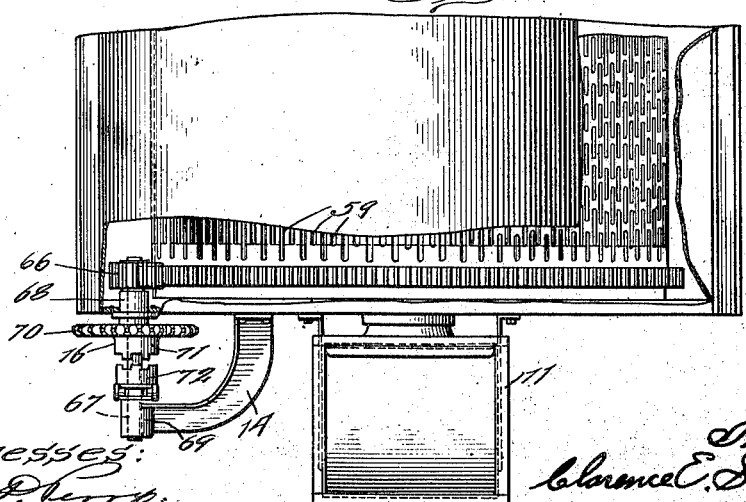

1,290,396.

Patented Jan. 7, 1919.
4 SHEETS—SHEET 3.

Witnesses:

Inventor:
Clarence E. Steere
By Jones, Addington, Ames & Seibold
Attys.

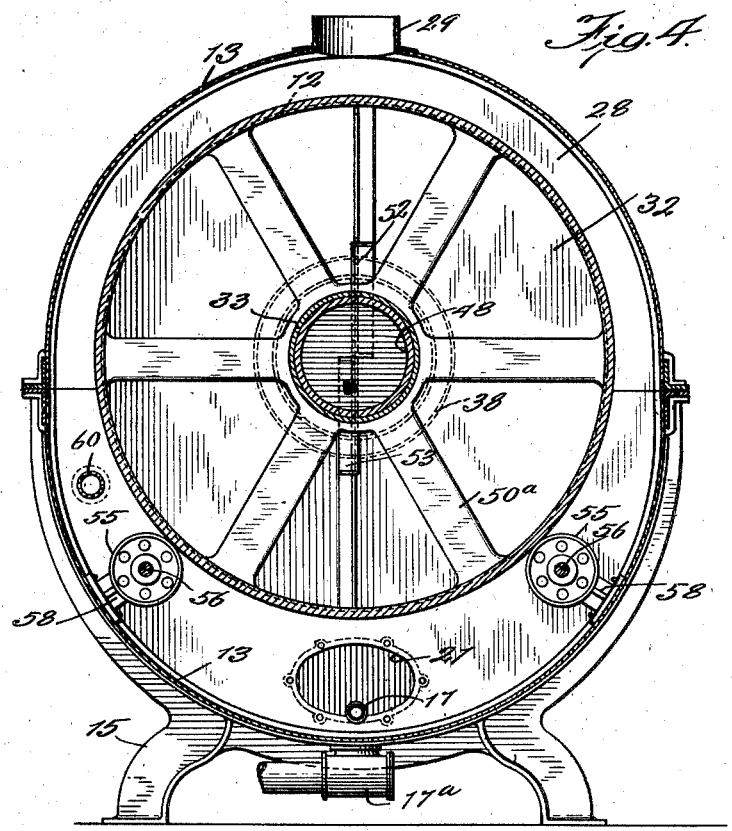
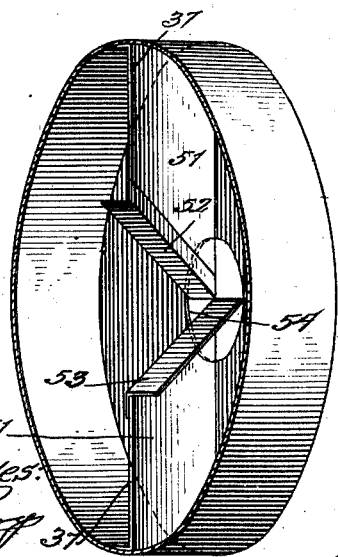

UNITED STATES PATENT OFFICE.

CLARENCE E. STEERE, OF CHICAGO, ILLINOIS, ASSIGNOR TO SPRAGUE CANNING MACHINERY COMPANY, OF CHICAGO, ILLINOIS, A CORPORATION OF ILLINOIS.

BLANCHING-MACHINE.

1,290,396.  Specification of Letters Patent.  Patented Jan. 7, 1919.

Application filed August 9, 1915. Serial No. 44,596.

*To all whom it may concern:*

Be it known that I, CLARENCE E. STEERE, a citizen of the United States, residing at Chicago, in the county of Cook and State of Illinois, have invented new and useful Improvements in Blanching-Machines, of which the following is a full, clear, concise, and exact description, reference being had to the accompanying drawing, forming a part of this specification.

My invention relates to blanching machines, that is, to machines for washing and cooking material such as peas which are to be canned, in which the loose material is fed through a water tank in which the material is washed and cooked.

One of the objects of my invention is to simplify the construction of such machinery and increase its efficiency.

In the drawings in which I have shown one embodiment of my invention

Figure 1 is a vertical axial section of a blanching machine showing the conveyer within the tank, and the hopper which supplies the material to the conveyer;

Fig. 2 is a front elevation of the machine showing the tank and the hood which houses the upper half of the conveyer;

Fig. 4 is a section on the line 4—4 of Fig. 1 showing the cylindrical conveyer and the supporting rollers therefor;

Fig. 5 is a plan view of the front end of the machine, part of the hood being broken away to show the perforations in the cylindrical conveyer, and showing the driving and clutch mechanism for the conveyer;

Fig. 7 is a perspective view of a portion of the rear end of the conveyer showing the discharge vanes for lifting the material out of the conveyer.

Figure 3:
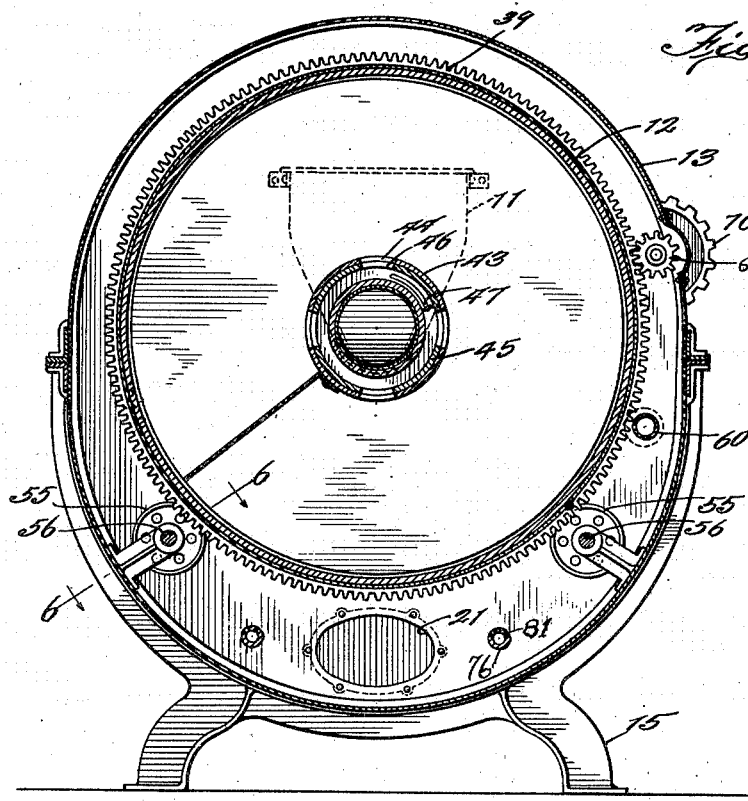
Fig. 3 is a vertical section on the line 3—3 of Fig. 1 showing the drive mechanism for the conveyer, and showing the distributing chamber in cross section.

Referring now to the drawings in detail the machine shown comprises a supply hopper 11 to which the material to be washed or cooked is supplied in any suitable manner, a rotatable screw conveyer 12 to which the material is fed from the hopper, a tank 13 in which the conveyer rotates, a hood 14 for inclosing the upper part of the conveyer, supports 15 on which the tank is mounted, driving mechanism 16 for the conveyer, steam supply piping 17 for heating the water in the tank, and supply piping 17ª for supplying water to the tank.

The tank 12 comprises a semi-cylindrical casing 18 which may be of sheet material and substantially semi-circular front and rear heads 19 and 20 to which the casing 18 is secured. The front and rear heads 19 and 20 are provided with hand holes 21 and 22 for cleaning, inspection, etc., which are closed by hand hold plates 23 and 24. The hood 14 comprises semi-cylindrical portions 25 which may be of sheet metal, yoke members 26 to which the portions 25 are connected and front and rear heads 27 and 28 which match up with the front and rear heads 19 and 20 of the tank to inclose the ends of the conveyer 12. The hood is provided with vent fittings 29 to allow for the escape of steam. The conveyer 12 comprises a perforated cylindrical casing 30 which may be of sheet metal, circular front and rear heads 31 and 32 to which the casing 30 is connected and a central hollow core 33 which may be of cast iron, front and rear fittings 34 and 35 which also may be of cast iron, a helical web 36 extending between the core 33 and casing 30, discharge vanes 37 for lifting the material out of the conveyer, and a flaring discharge fitting 38 through which the material is delivered after it has been washed and cooked. The front fitting 34 comprises a gear portion 39 for connection with the driving mechanism, a roller engaging portion 40 for engagement with the supporting rollers, a flange portion 41 to which the casing 30 is secured, a flange portion 42 to which the core 33 is connected, a distributing chamber 43 which receives the material from the hopper 11, and arms 43ª extending between the discharge chamber and the gear portion 39. The discharge chamber 43 is provided with openings 44 to permit the escape of the material therethrough as the chamber rotates. The capacity of these openings may be varied by means of an annular adjustable member 45 located within the chamber 43, and provided with openings 46 corresponding in size and location to the openings 44. The member 45 may be held in adjusted position in any suitable manner, as by screw and slot connection 47 (Figs. 1 and 3).

The rear fitting 35 comprises a central flange portion 48 to which the core 33 is connected, a closer portion 48ª for closing the end of the core, an outer flange portion 49 to which the casing 30 is connected, a roller engaging portion 50 for engagement with the supporting rollers, and arms 50ª extending between the flange portion 48 and the roller engaging portion 50. The discharge vanes 37 (Fig. 7) comprise wing portions 51 which are beveled at their inner ends as shown at 52, for lifting the material to be discharged, and guide portions 53 for directing the material toward the discharge opening 54.

Figure 6:
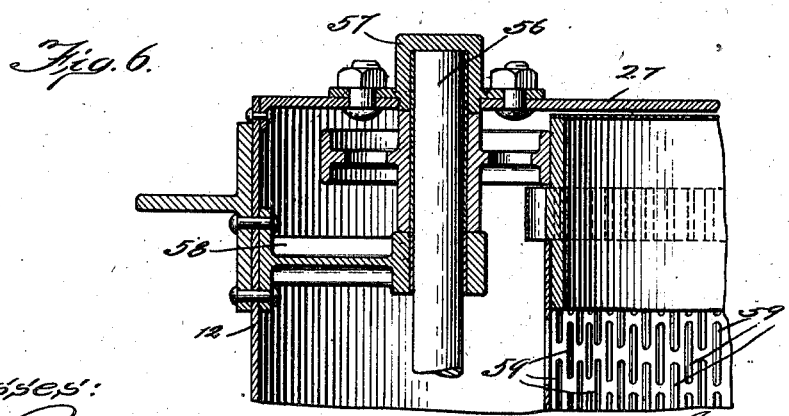
Fig. 6 is a section on the line 6—6 of Fig. 3 showing one of the rollers for supporting the conveyer and the bearings for this roller.

The roller engaging portions 40 and 50 rest on rollers 55 (Figs. 1, 4 and 6) which are mounted on longitudinally extending shafts 56 mounted in bearings 57 and 58. The casing 30 is provided with perforations 59 to permit the water in the tank 13 to enter the conveyer to wash and cook the material therein. The tank 13 may be provided with a drain outlet 60 to draw off surplus water from the tank. The hopper 11 comprises a discharge spout 61 which extends through openings 62 and 63 in the head 27 of the hood and head 31 of the conveyer, respectively, to deliver the material from the hopper to the distributing chamber 43, and is provided with an adjustable slide 64 for cutting off the material in the hopper from the discharge chamber, and is hinged to the front head 27 of the hood, as shown at 65, so that the hopper can be swung outwardly and upwardly, as shown in dotted lines in Fig. 1, to permit access to the distributing chamber and to the adjustable member 45.

The driving mechanism 16 comprises a pinion 66 meshing with the gear portion 39, a shaft 67 on which the pinion is secured, bearings 68 and 69 in which the shaft is mounted, and a sprocket 70 driven by any suitable mechanism, not shown. The sprocket 70 is provided with a clutch portion 71 for engagement with a clutch member 72 which is operated by means of a clutch shifting lever 73 pivoted on the bracket 74 secured to the front head 27 of the hood.

The operation of the machine is as follows: Material is supplied to the hopper 11 in any suitable manner; water is supplied to the tank 13 through the supply pipe 17ª, and water is heated by means of steam supplied through the piping 17. The sprocket 70 is driven from any suitable source of power, not shown. The clutch lever 73 is shifted to cause the clutch members 72 and 71 to engage to cause the rotation of the cylindrical conveyer 12 through the medium of the pinion 66 and gear portion 39. The slide 64 is opened to permit the material in the hopper 11 to gravitate into the distributing chamber 43 from whence it drops through the openings 44 and 46 into the interior of the casing 30. As the casing 30 rotates the material therein, due to its gravity, tends to remain in the bottom part of the casing and follows the convolutions formed by the web 36 and is thus advanced from the front to the rear end of the casing. At the rear end of the casing the material is lifted by the wings 51 and directed by the guides 53 to cause it to pass up through the opening 54 and discharge fitting 38. As the material is passing through the conveyer it is thoroughly washed and cooked by the water which forced its way within the casing 30 through the opening 59. The capacity of the opening 44 may be varied by adjusting the member 45. When it is desired to adjust this member 45 the slide 64 is closed and the hopper 11 swung up out of the way to permit access to the interior of the distributing chamber.

If desired means may be provided for supplying compressed air to agitate the material as it is advanced through the conveyer. For this purpose, I have shown a supply piping, indicated in general at 75, comprising two distributing pipes 76 extending longitudinally beneath the conveyer, and through the front head of the tank, two vertical pipe sections 77 communicating with the pipe 76, two horizontal pipe sections 78 communicating with the sections 77, an elbow 29 and a T-fitting 80 for connecting the various pipe sections. The T-fitting 80 is connected with any suitable source of compressed air. The distributing pipes 77 are provided with jet apertures 81 (Fig. 3) through which the air escapes into the water in the tank beneath the conveyer.

As the conveyer rotates the air escaping through the jet apertures 81 rises up against the lower surface of the casing 30 and finds its way through the perforations 59 in the casing and rises up through the material which is being advanced through the casing causing the material to be further agitated.

Having thus described my invention what I claim as new and desire to secure by Letters Patent is:—

1. In a machine of the class described, a tank, a conveyer operating therein, said conveyer comprising a rotatable casing having a head at one end thereof having an opening therethrough, said conveyer having a distributing chamber located within said casing in communication with said opening, said chamber having an opening therefrom to the interior of said casing, and means for adjusting the capacity of said last opening.

2. In a machine of the class described, a tank, a conveyer operating therein, said conveyer comprising a rotatable casing having a head at one end thereof having an opening therethrough, said conveyer having a distributing chamber located within said casing in communication with said opening, said chamber having an opening therefrom to the interior of said casing, means for adjusting the capacity of said last opening and means for supplying material to said distributing chamber comprising a hopper pivotally mounted so that it can be swung away to permit access to said adjusting means.

3. In a machine of the class described, a tank, a conveyer operating therein, said conveyer comprising a rotatable casing having a head at one end thereof having an opening therethrough, said conveyer having a distributing chamber located within said casing in communication with said opening, said chamber having an opening therefrom to the interior of said casing, means for adjusting the capacity of said last opening and means for supplying material to said distributing chamber comprising a hopper pivotally mounted so that it can be swung away to permit access to said adjusting means, said pivot being located so that gravity will normally hold said hopper in position to deliver to the distributing chamber.

4. In a machine of the class described, a tank, a conveyer operating therein, said conveyer comprising a rotatable casing having a head at one end thereof having an opening therein, said conveyer having a hollow core and a helical web connecting said casing and core, a member located within said casing having a flange portion for engaging said hollow core and having a distributing chamber therein in communication with said opening, said chamber having an opening therefrom to the interior of the casing.

5. In a machine of the class described, a tank, a conveyer operating therein, said conveyer comprising a rotatable casing having a head at one end thereof having an opening therein, said conveyer having a hollow core and a helical web connecting said casing and core, a member located within said casing having a flange portion for engaging said hollow core and having a distributing chamber therein in communication with said opening, said chamber having an opening therefrom to the interior of the casing, said member also having a flange portion engaging said casing.

6. In a machine of the class described, a tank, a conveyer operating therein, said conveyer comprising a rotatable casing having a head at one end thereof having an opening therein, said conveyer having a hollow core and a helical web connecting said casing and core, a member located within said casing having a flange portion for engaging said hollow core and having a distributing chamber therein in communication with said opening, said chamber having an opening therefrom to the interior of the casing, said member also having a flange portion engaging said casing and a gear portion for engagement with a driving member.

7. In a machine of the class described, a tank, a conveyer operating therein, said conveyer comprising a rotatable casing having a head at one end thereof having an opening therethrough, said conveyer having a distributing chamber located within said casing in communication with said opening, said chamber having an opening therefrom to the interior of said casing, and means for adjusting the capacity of said last opening, said chamber being substantially cylindrical, and said adjusting means comprising a cylinder having an opening registerable with the opening leading from the chamber fitted within said chamber.

8. In a machine of the class described a tank, a conveyer for advancing material through said tank, and means for supplying air to agitate the material as it is forced through said tank, said conveyer comprising an apertured casing along which said material is advanced, the air being supplied to the material through said apertures.

9. In a machine of the class described a tank, a screw conveyer for advancing material through said tank, and means for supplying air to agitate the material as it is forced through said tank, said conveyer comprising a rotatable apertured casing along which said material is advanced, the air being supplied to the material through said aperture.

10. In a machine of the class described a tank, a conveyer for advancing material through said tank, and means for supplying air to agitate the material as it is forced through said tank, said conveyer comprising an apertured casing along which said material is advanced, the air being supplied to the material through said apertures, said air supply means comprising a pipe provided with jet openings located below the water line of said tank.

11. In a machine of the class described a tank, a screw conveyer for advancing material through said tank, and means for supplying air to agitate the material as it is forced through said tank, said conveyer comprising a rotatable apertured casing along which said material is advanced, the air being supplied to the material through said apertures, said air supply means comprising a pipe having jet openings therein located below the water line of said tank beneath said apertured casing.

In witness whereof, I have hereunto subscribed my name in the presence of two witnesses.

CLARENCE E. STEERE.

Witnesses:
LELAND A. BABCOCK,
DANIEL G. TRENCH.